A. D. HOGG.
SPARE WHEEL FOR VEHICLES.
APPLICATION FILED FEB. 2, 1920.
1,340,485.                          Patented May 18, 1920.
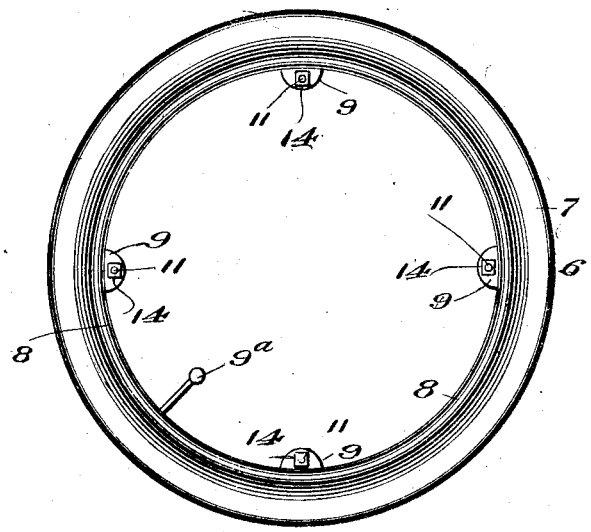
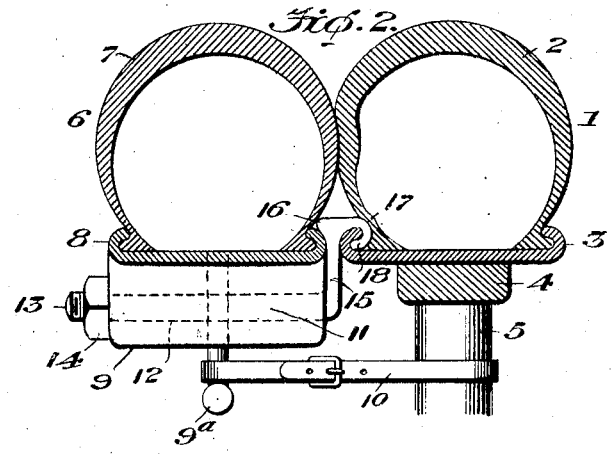
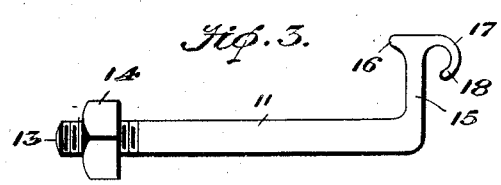
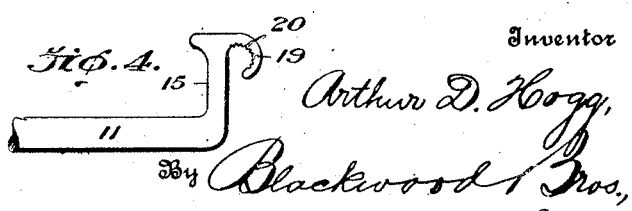

UNITED STATES PATENT OFFICE.

ARTHUR DAVID HOGG, OF GRAND FORKS, NORTH DAKOTA.

SPARE WHEEL FOR VEHICLES.

1,340,485.   Specification of Letters Patent.   Patented May 18, 1920.

Application filed February 2, 1920. Serial No. 355,676.

*To all whom it may concern:*

Be it known that I, ARTHUR DAVID HOGG, residing at Grand Forks, county of Grand Forks, State of North Dakota, a citizen of the United States, have invented certain new and useful Improvements in Spare Wheels for Vehicles; and I do hereby declare the following to be a full, clear, and exact description of the invention, such as will enable others skilled in the art to which it pertains to make and use the same.

My invention relates to an improvement in a spare wheel for vehicles and more particularly to a spare or auxiliary wheel for use on automobiles.

The invention has for its object to provide means for quickly and firmly securing a spare wheel having a rim carrying a pneumatic tire to the ordinary wheel of an automobile for the purpose of taking the load when the tire of the ordinary wheel has become punctured or otherwise damaged to such an extent that it is unfit for use.

It further has for its object to provide improved means for securing a spare wheel to an ordinary wheel of an automobile in order to widen the tread of the wheel especially when it is desired to travel over muddy, marshy or sandy roads.

It further has for its object to provide a spare wheel for an automobile which is capable of being attached, in about three minutes, alongside an existing wheel without requiring any additional hub or spoke construction other than the construction included in the existing wheel to which the spare wheel is attached.

It further has for its object to provide a spare wheel for use in an emergency which is strong enough to bear the weight required of it.

It further has for its object to provide a spare wheel which will take the load off an ordinary punctured tire and allow the automobile to proceed on its way without taking off the punctured tire or pumping it up while on the road.

It further has for its object to provide a spare wheel which is simple, inexpensive and durable in construction, easy to secure in place and which is very handy and convenient.

It further has for its object to provide a spare wheel which is capable of being easily carried on the side, rear or other part of an automobile and which may be applied equally as well to either the front or rear wheels.

It further has for its object to provide means whereby a new automobile may be driven under its own power and delivered to a customer or moved from place to place without soiling the new tires on the wheels.

It still further has for its object to secure the spare wheel in place in such manner that it will prevent all creeping or circumferential motion between the ordinary automobile wheel and the spare wheel.

The invention consists in the several features and in the construction, combination and arrangement of features as more fully hereinafter described and claimed.

Referring to the drawings:—

Figure 1 is a side view of the invention.

Fig. 2 is a cross-sectional view showing the invention applied to an ordinary road wheel of an automobile.

Fig. 3 is a side view of the clamping means for securing or attaching the spare wheel in place.

Fig. 4 is a side view of a modified form of clamping means for securing or attaching the spare wheel in place.

In the drawings in which similar reference characters denote similar parts throughout the several views, 1 represents an ordinary automobile road wheel provided with a pneumatic tire 2, a rim 3, a felly 4, and spokes 5.

The spare or auxiliary wheel 6 comprises a pneumatic tire 7, an annular rim 8, rounded lugs 9, and a pin $9^a$, each projecting radially inward from the rim, and a strap 10, is provided to engage the pin $9^a$ and a spoke of the ordinary wheel to prevent creeping or circumferential motion between the ordinary wheel and the spare or auxiliary wheel.

The means for securing the spare or auxiliary wheel to the ordinary wheel of an automobile comprises a series of bolts 11, preferably four in number, passing through holes 12 in the lugs 9 and each having one end 13 screwthreaded and provided with a screw nut 14, and the opposite end provided with an outwardly extending arm 15, terminating in an inwardly and laterally projecting rounded lug 16 and an outwardly and laterally projecting hooked-shaped lug 17 the end 18 of which extends inwardly toward the arm 15.

In the modified form of clamping means shown in Fig. 4, the hooked-shape lug 19 is roughened or provided with corrugations 20 in order to keep the same from slipping on the rim of the ordinary wheel. In order to attach the spare or auxiliary wheel the ordinary wheel with a flat or deflated tire is jacked up, the tire pushed or moved laterally away from the outer edge of its rim, the plurality of hooked shaped lugs of the bolts of the spare or auxiliary wheel are then placed over the edge of the rim of the ordinary wheel and they engage and clamp the rim and also the deflated tire and serve not only to lock the plurality of lugs to the rim but also retain the deflated tire in place. The series of nuts are then screwed up until the lugs 16 engage the outer edge of the rim of the spare or auxiliary wheel and the rim of the ordinary wheel and the rim of the spare or auxiliary wheel abut against the surface of the arms 15 of the bolts 11, the strap 10 is then applied to the radial pin 9ª and one of the spokes of the ordinary wheel and the jack removed when the automobile is ready for use. This operation firmly locks the two wheels together and the inflated tire on the spare or auxiliary wheel will hold the deflated tire on the ordinary wheel clear of the ground.

If the user of a car supplied with two of my improved spare wheel attachments is making a somewhat long journey and reaches road conditions where single tires on the rear wheels are not sufficient for comfort, or to support the weight on a rough road, he can simply apply the two attachments to the two rear wheels. When any one tire becomes disabled, it is not necessary to stop for repairs or any longer than necessary to simply clamp one of my improved supplemental devices to the side of the wheel the tire of which has become disabled.

By the term "spare wheel", I desire it to be understood that I refer to a member or supplemental wheel part which will serve, when coupled to the main or ordinary wheel, as a support for that portion of the load usually carried by the main or ordinary wheel, when the tire of the main or ordinary wheel has become ruptured or deflated. The so-called "spare wheel" carries an inflated tire and is ready for use upon the contingency of puncture or deflation of the main or ordinary wheel tire.

I do not wish to be understood as limiting myself to the specific details of construction and arrangement as herein described and illustrated, as it is manifest that variations and modifications may be made in the features of construction and arrangement, in the adaptation of the device to various conditions of use, without departing from the spirit and scope of my invention and improvements. I therefore reserve the right to all such variations and modifications as properly fall within the scope of my invention and the terms of the following claims.

What I claim is:—

1. In a spare wheel, bolts, an integral arm projecting from each of said bolts having oppositely disposed lugs and a rim in which said bolts are mounted.

2. In a spare wheel, bolts, an arm projecting from each of said bolts having oppositely disposed lugs, one of said lugs being hooked-shaped, and a rim in which said bolts are mounted.

3. In a spare wheel, bolts, an integral arm projecting at an angle to each of said bolts and having formed integral therewith oppositely disposed laterally extending lugs and a rim in which said bolts are mounted.

4. In a spare wheel, screw-threaded bolts, an arm projecting from each of said bolts and terminating in oppositely disposed lugs, one of said lugs being hooked-shaped and the other having a rounded end, and a rim in which said bolts are mounted.

5. In a spare wheel, bolts, an arm projecting from each of said bolts and provided with oppositely disposed lugs, one of said lugs being curved toward the said arm and the other lug extending from said arm, and a rim in which said bolts are mounted.

6. In a spare wheel, bolts, oppositely disposed integral means projecting from each of said bolts for engaging the rim of a spare wheel and also the rim of an ordinary wheel and a rim on which said bolts are mounted.

7. In a spare wheel, bolts, oppositely disposed integral means projecting from each of said bolts for engaging the rim of a spare wheel and the rim of an ordinary wheel, and a rim on the spare wheel provided with lugs in which the said bolts are mounted.

8. In a spare wheel, bolts, an integral arm projecting from each of said bolts having oppositely disposed lugs, a rim in which said bolts are mounted, a pin on said rim and a strap adapted to engage said pin and the spoke of an ordinary wheel for the purpose of preventing circumferential motion between the spare wheel and the ordinary wheel.

9. In a spare wheel, bolts, means integral with said bolts for engaging the rim of a spare wheel and the rim of an ordinary wheel projecting from each of said bolts and means for preventing circumferential motion between said tires.

10. In a spare wheel, bolts, each having integral means for engaging the rim of a spare wheel and the rim of an ordinary wheel, a rim having lugs in which said bolts are mounted, a pin projecting from said rim and a strap for engaging said pin and a spoke on an ordinary wheel.

In testimony whereof I have affixed my signature.

ARTHUR DAVID HOGG.